United States Patent [19]

Reule et al.

[11] Patent Number: 4,707,838

[45] Date of Patent: Nov. 17, 1987

[54] CURRENT SUPPLY FOR RADIATION SOURCES OF FREQUENCY-PROPORTIONAL OPTICAL SENSORS

[75] Inventors: Alfred Reule; Joachim Schröder, both of Aalen, Fed. Rep. of Germany

[73] Assignee: Carl-Zeiss-Stiftung, Heidenheim, Fed. Rep. of Germany

[21] Appl. No.: 836,242

[22] Filed: Mar. 5, 1986

[51] Int. Cl.[4] .......................... H01S 3/00; H01S 3/13; G01J 1/32

[52] U.S. Cl. ....................................... 372/38; 372/29; 372/30; 372/31; 372/25; 372/26; 250/205; 332/7.51

[58] Field of Search ....................... 372/38, 29, 30, 31, 372/25, 26; 315/151; 250/205; 332/7.51

[56] References Cited

U.S. PATENT DOCUMENTS

| | | | |
|---|---|---|---|
| 3,068,746 | 12/1962 | Vawter | 250/205 |
| 3,123,724 | 3/1964 | Schronk et al. | 250/205 |
| 3,360,650 | 12/1967 | Lawrence | 250/205 |
| 3,705,316 | 12/1972 | Burrows et al. | 250/205 |
| 3,949,226 | 4/1976 | Dugan et al. | 250/205 |
| 4,097,732 | 6/1978 | Krause et al. | 250/205 |
| 4,198,675 | 4/1980 | Moore | 250/205 |
| 4,237,427 | 12/1980 | Holland | 372/38 |
| 4,277,755 | 7/1981 | Fausone et al. | 250/205 |
| 4,385,387 | 5/1983 | Trimmel | 372/26 |
| 4,406,996 | 9/1983 | Oka | 250/205 |
| 4,450,564 | 5/1984 | Meuleman et al. | 372/26 |
| 4,577,320 | 3/1986 | Yoshikawa et al. | 372/38 |

FOREIGN PATENT DOCUMENTS 2113837 8/1983 United Kingdom .

OTHER PUBLICATIONS

IEEE Standard Dictionary of Electrical and Electronic Terms, p. 791, Third Edition.

*Primary Examiner*—Eugene R. Laroche
*Assistant Examiner*—Michael B. Shingleton
*Attorney, Agent, or Firm*—Walter Ottesen

[57] ABSTRACT

A current supply is disclosed for frequency-proportional optical sensors, preferably fiber-optical sensors, having a constant amplitude modulated over time. The delay time of the modulation is kept constant as well in the current supply in order to increase the accuracy of measurement. A variable resistor that is connected in series with the LED or the semiconductor laser is used for this purpose. This resistor may for example be a photoresistor illuminated by a light source and the resistance value of this resistor is varied by an open-loop or closed-loop control circuit. The variable resistor may also be a resistor that is heated by its own current.

15 Claims, 26 Drawing Figures

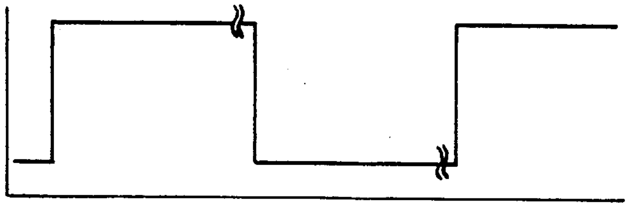
Fig.2a
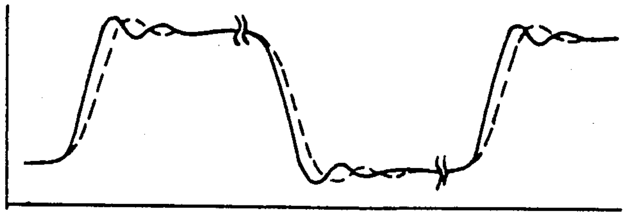
Fig.2b
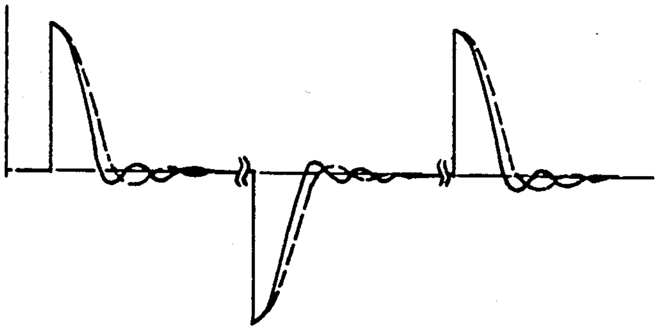
Fig.2c
Fig.2d
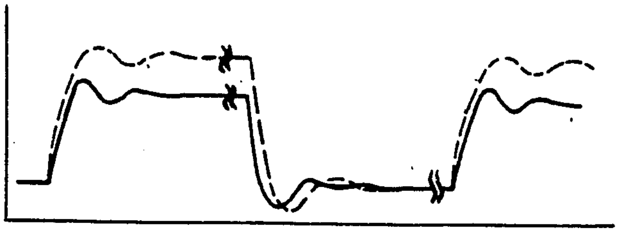
Fig.2e
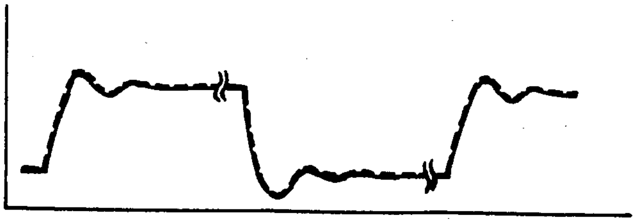

CURRENT SUPPLY FOR RADIATION SOURCES OF FREQUENCY-PROPORTIONAL OPTICAL SENSORS

FIELD OF THE INVENTION

The invention relates to a current supply means for an LED or a semiconductor laser for frequency-proportional optical sensors, preferably fiber-optical sensors, for generating a modulation signal having a time modulated, constant amplitude.

BACKGROUND OF THE INVENTION

In comparison with other optical sensors, which measure the intensity or phase of the light, frequency-proportional optical sensors are distinguished by being less distorted by ambient factors. In frequency-proportional optical sensors, the radiation source is as a rule modulated with the measurement frequency. This is most simply, and hence most frequently, done by modulating the supply current of the radiation source. A modulation of this kind, for a fiber-optical temperature sensor, is known from published British patent application GB-PA No. 21 13 837, for example.

However, the accuracy of measurement in frequency-proportional optical sensors is limited by the following properties of the radiation source:

(a) nonlinearity of the relationship between the supply current and the radiation output;

(b) temperature dependency of the radiation output at a constant current;

(c) time dependency of the radiation output at a constant current over short periods of time, caused for example by self-heating due to the operating current;

(d) time dependency of the radiation output at a constant current over long periods of time caused by aging of the radiation source;

(e) wavelength dependency of the properties (a) to (d) above;

and, (f) alteration of the frequency response of the modulation amplifier and radiation source, if modulation or amplification varies.

SUMMARY OF THE INVENTION

It is an object of the invention to drive an LED or a semiconductor laser suøh that the above disadvantages are either avoided or greatly diminished.

This object is attained in accordance with the invention by providing a reference receiver, to which a portion of the LED or semiconductor laser radiation is conducted, and by providing a variable resistor, the variation of which keeps the delay time of the reference signal constant; the variable resistor is connected in series with the LED or the semiconductor laser.

The term "delay time" is used herein to mean the time delay between the command signal and the reference signal. In the case of square wave modulation, this time delay is equivalent to the quantity conventionally known as rise time (or, correspondingly, fall time), while in the case of sinusoidal modulation, it is equivalent to the phase shift.

In a preferred embodiment, the variable resistor is a photoresistor illuminated by a light source, a heatable resistor heated by a heating resistor, or a potentiometer actuated by a motor.

In another preferred embodiment, the variable resistor is a resistor that is heated by its own current. In that case, it is assured that a suitable characteristic curve (such as that shown in FIG. 3*a* of the drawing) will be attained by incorporating suitable parallel and series resistors in the circuit.

If the variable resistor does not automatically vary, as in the above embodiment, then a suitable open-loop or closed-loop control arrangement is needed for varying the resistance.

In one suitable embodiment, in order to generate a control signal, a resistor is connected in series with the LED or the semiconductor laser. The resistor is connected with a differential amplifier, via a resistor-capacitor element for averaging the voltage, and the second input of the differential amplifier is connected to an index-value generator.

In another suitable embodiment, in order to generate a control signal for the variable resistor, a resistor is connected in series with the LED or the semiconductor laser; this resistor is connected with a network having a nonlinear characteristic curve, via a resistor-capacitor element for averaging the voltage.

In the above embodiments, the command signal may be in either square-wave, sinusoidal or triangular-wave form.

In a particularly advantageous embodiment with square-wave modulation, in order to generate a closed-loop or regulating signal for the variable resistor, a differential amplifier is provided for forming a difference signal between the command signal and the reference signal. The output of this differential amplifier is compared in a second differential amplifier with the output of an index-value generator, and the difference is supplied to an integrator, the output of which is connected to a sample and hold circuit. The integrator may be connected at one or both edges of the modulation signal.

Further advantageous features and embodiments of the invention will become apparent from the description and claims which follow.

An advantage of the invention is that the fundamentally unattainable ideal modulation signal is replaced with a modulation signal having not only a constant amplitude but also a constant delay time. As a result, distortion and measurement inaccuracy due to variations in the delay time are avoided.

Exemplary embodiments of the invention are described below in terms of square-wave modulation for the sake of simplicity. They are equally applicable, however, to other forms of modulation, such as sinusoidal or triangular-wave modulation.

BRIEF DESCRIPTION OF THE DRAWING

The invention will now be described with reference to the drawing wherein:

FIGS. 2*a* to 2*e* are time diagrams for explaining the mode of operation of the control of FIG. 1;

DESCRIPTION OF THE PREFERRED EMBODIMENTS OF THE INVENTION

Figure 1:
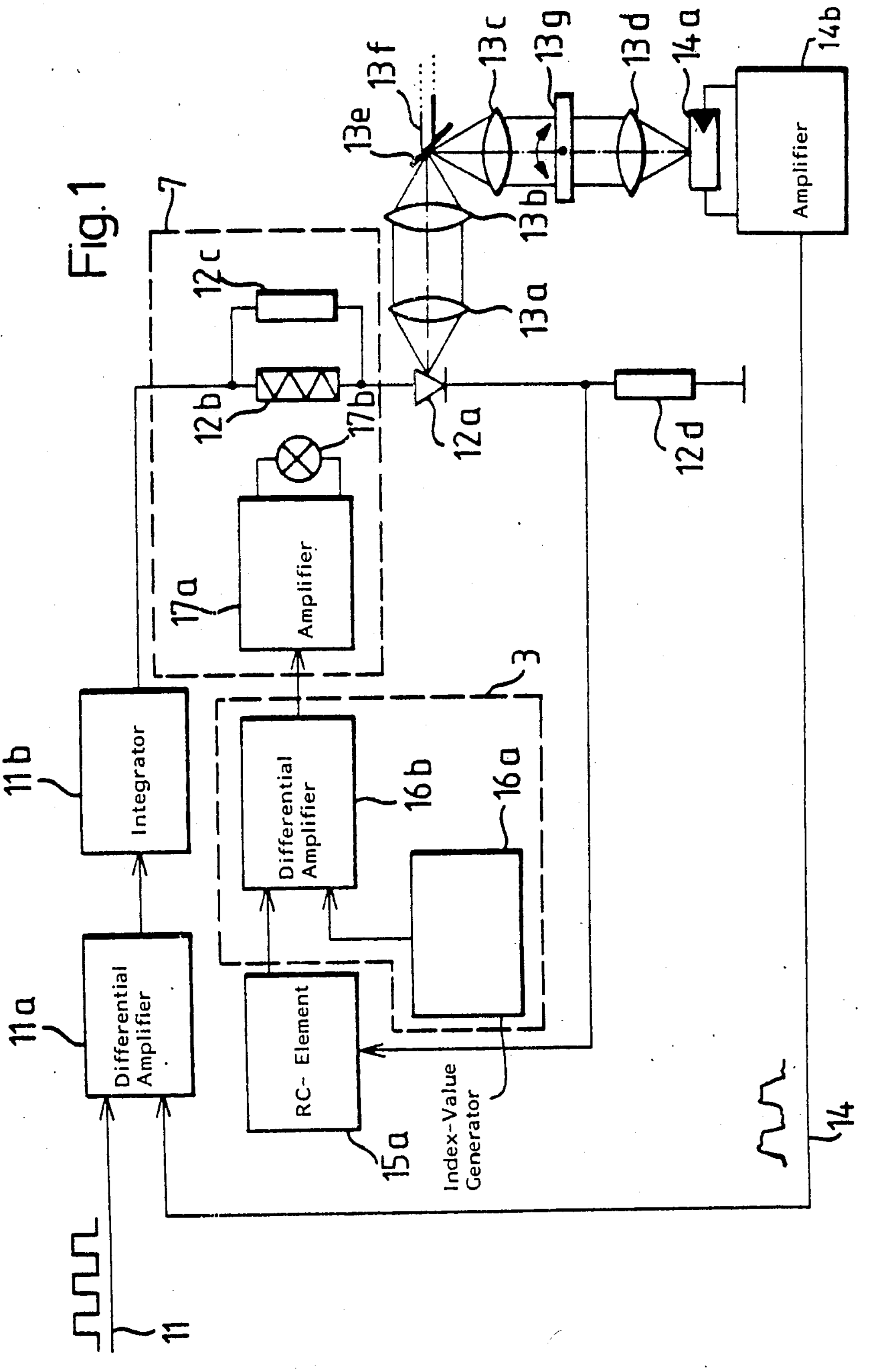
FIG. 1 is a block circuit diagram for the open-loop control of the current of the radiation source.

In FIG. 1, an LED 12a is shown, the radiation of which is directed via focusing lenses 13a and 13b into the light-conducting fiber 13f. The radiation that is reflected at the inclined front surface of the light-conducting fiber 13f and the surface 13e surrounding that surface is imaged by the focusing lenses 13c and 13d onto the reference receiver 14a, for instance a photodiode, where it generates an electrical signal. This signal is amplified in the amplifier 14b and then, as a reference signal 14, is compared in the differential amplifier 11a with the command signal 11. For the ensuing description, it is assumed that the command signal 11 takes the square-wave waveform shown in the time diagram of FIG. 2a. As already noted, however, a sinusoidal or delta-wave waveform would also be possible.

If the command signal 11 takes the waveform shown in FIG. 2a, then the reference signal, because of the time constants of the radiation source and the time constants of the other components involved, takes the course shown by a solid line in FIG. 2b. It should be noted that the transient effect, at a frequency of approximately 1 kHz, is shorter than 1/100 of the half period. The signal course shown by a solid line in the time diagram of FIG. 2c appears at the output of the differential amplifier 11a. This signal is supplied to the integrator 11b, at the output of which the signal course shown in FIG. 2d appears, which is supplied directly to the radiation source 12a. On the other hand, if required, the output of integrator 11b can be supplied to radiation source 12a via an amplifier.

If the radiation emission now diminishes, for instance due to an increase in ambient temperature of the radiation source 12a, which for the sake of simplicity is assumed to be abrupt, then the rise of the reference signal at the beginning of the modulation period becomes slower, as illustrated by a broken line in FIG. 2b. As a result, the voltage shown in a broken line in FIG. 2c and present at the output of the differential amplifier 11a drops more slowly, and the voltage at the output of the integrator 11b, shown by a broken line in FIG. 2d, increases faster and rises to a higher value than before the temperature jump, until the amplitude of the reference signal (FIG. 2b) has assumed the value of the command signal (FIG. 2a). Thus the integrator output attains a higher level, and the current through the radiation source 12a is increased such that the reference voltage in FIG. 2b regains the same level again, after the transient period. In this manner, a constant amplitude is attained, regardless of the radiation yield of the radiation source 12a. The regulation is effected so rapidly that it is already leveled at the onset of each half-wave of modulation.

The above-described regulation of the constancy of the amplitude has the disadvantage, however, that (as shown in FIG. 2b) the transient effect, that is, the delay time of the modulation signal, is altered, which impairs the accuracy of frequency-proportional optical sensors.

In order to attain not only a constant amplitude but also a constant delay time, a variable resistor 12b and a fixed resistor 12d are connected in series with the radiation source 12a in the exemplary embodiment shown in FIG. 1. At the resistor 12d, a voltage drop appears which is proportional to the current through the radiation source 12a. This voltage drop is averaged by the resistor-capacitor element 15a over many modulation periods, which is possible because temperature changes or aging phenomena take place slowly as compared with the modulation frequency. The direct voltage generated by the resistor-capacitor element 15a is proportional to the mean current through the radiation source 12a. This direct voltage is supplied to a differential amplifier 16b, the second input of which is connected to the index-value generator 16a. By means of an adjustable voltage, the particular value for the delay time that is to be kept constant by the open-loop control operation can be set at this index-value generator 16a.

A light source 17b, for instance an incandescent lamp, which illuminates the photoresistor 12b is supplied by the output of the differential amplifier 16b and, if required, via a further amplifier 17a. The photoresistor 12b and the shunt resistor 12c form a purely ohmic variable compensating resistor for the radiation source 12a. The resistor 12c serves to keep the load on the resistance of the photoresistor low. The photoresistor 12b is altered by the illumination of the light source 17b such that the variation in the radiation source 12a is thereby compensated for. As a result, all the other components in the closed-loop control circuit remain unaffected by the variation in the radiation source 12a. Because of the lessening of the resistance of 12b, the transient action becomes faster again; that is, the delay time is shortened, and thus returned to the value prevailing prior to the temperature jump, as shown for the reference signal in FIG. 2e.

In the exemplary embodiment shown in FIG. 1, by means of the index-value generator 16a and the differential amplifier 16b, a linear (but not proportional) relationship is established between the current through the radiation source 12a and the voltage for the light source 17b; by means of the degree of amplification of the differential amplifier 16b, the slope is adjusted such that the delay time remains constant for various currents. Accordingly, what is effected is not regulation, or closed-loop control, but rather open-loop control. The linear relationship is a good approximation, and in practice an adequate one in many cases, for keeping the delay time constant.

Figure 3A:
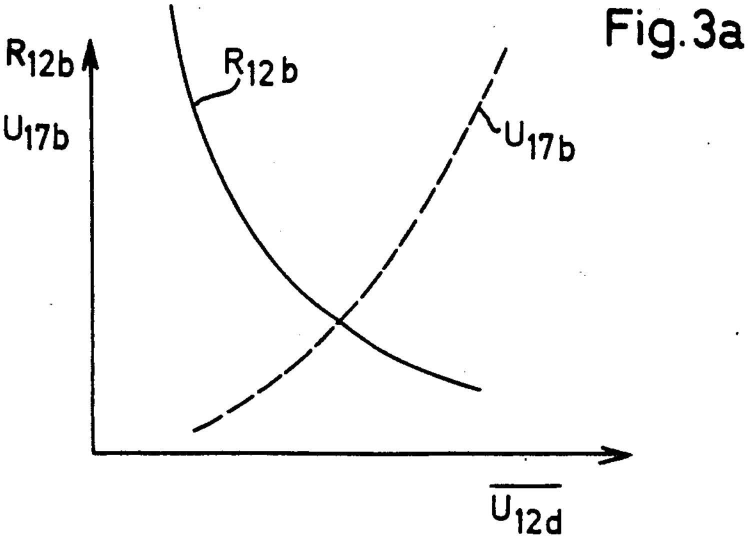
FIG. 3*a* shows characteristic curves for the variable resistance and for the incandescent lamp voltage.

If more stringent demands for accuracy are made, then the values $R_{12b}$ of the variable resistor 12b must have the dependency shown in FIG. 3a on the current through the radiation source 12a, or on the values $\overline{U_{12d}}$ for the mean voltage drop at the resistor 12d, or else they must correspond better to this dependency than is possible with a straight line course of the voltage for the light source 17b.

The dependency shown in FIG. 3a can be arrived at by computation. An experimental determination is better; this can be done, for instance, by inserting diaphragms or neutral filters into the path of the beam between the radiation source 12a and the reference receiver 14*a*, thereby (with amplitude regulation switched in) generating various currents for the radiation source 12*a*. By observation of the reference signal (FIG. 2*b*), for instance with an oscilloscope, the resistor 12*b* can be varied on an ongoing basis such that the delay time remains constant.

Figure 3B:
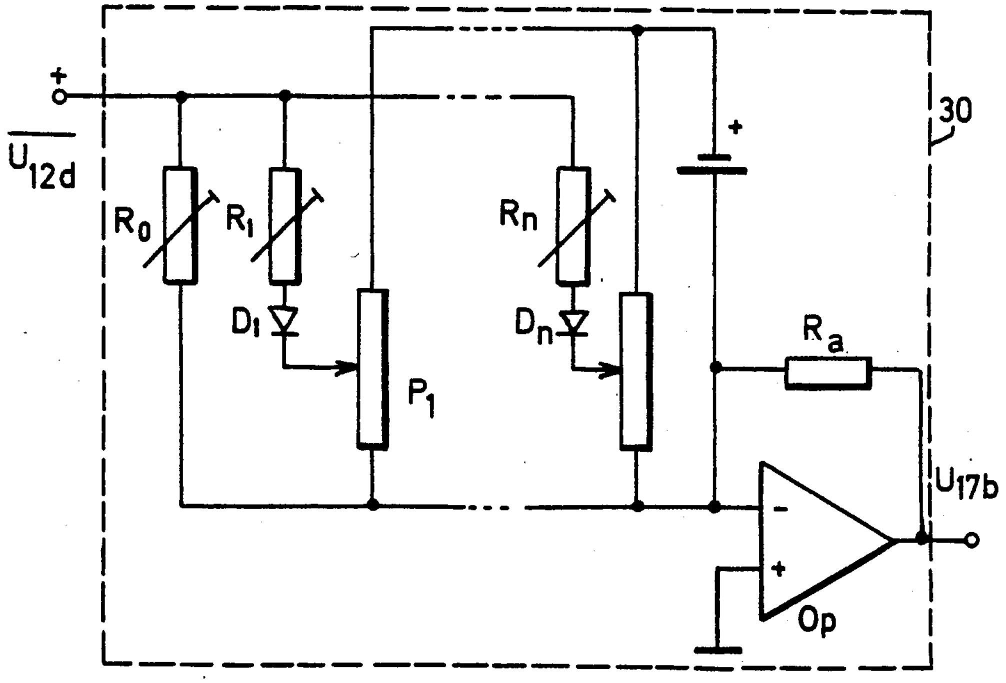
FIG. 3*b* shows a network, as a supplement to the embodiment of FIG. 1.

In FIG. 3*a*, the values $U_{17b}$ for the correct voltages of the incandescent lamp 17*b* with which the exact variations of the resistor 12*b* are attained are also plotted. For the best possible realization of this course, the network shown by way of example in FIG. 3*b* is suitable; by means of this network, the course is approximated by means of a polygon comprising n+1 straight line segments, if n is the number of parallel branches in the network. The known network of FIG. 3*b* comprises a parallel circuit of adjustable resistors $R_o$ to $R_n$, which become effective successively, with increasing voltage $\overline{U_{12d}}$. As long as $\overline{U_{12d}}$ is smaller than the voltage $U_1$ that is adjustable at the pickup of the potentiometer $P_1$, only $R_o$ is operative, because the diodes $D_1$ to $D_n$ prevent a flow of current into the input line. If the value of the voltage $\overline{U_{12d}}$ is between $U_1$ and $U_2 > U_1$, then the parallel circuit of $R_o$ and $R_1$ is operative, and so on. The negative feedback operational amplifier Op serves as an impedance transformer for the current flowing from the network, and thus prevents a voltage drop between the network output (that is, the input of the operational amplifier) and ground potential.

If the circuit portion 3 (having the index-value generator 16*a* and the differential amplifier 16*b*) of FIG. 1 is replaced by the network labeled 30 in FIG. 3*b*, then the accuracy attained for varying the variable resistor 12*b* is limited solely by the number of parallel branches in the network.

In the case of the open-loop control described by FIG. 1 for the variable resistor, this resistor need not comprise the photoresistor 12*b*. Instead, the circuit portion 7 of FIG. 1 can be replaced by the circuit portions 70 and 71 shown in FIGS. 7*a* and 7*b*.

Figure 7A:
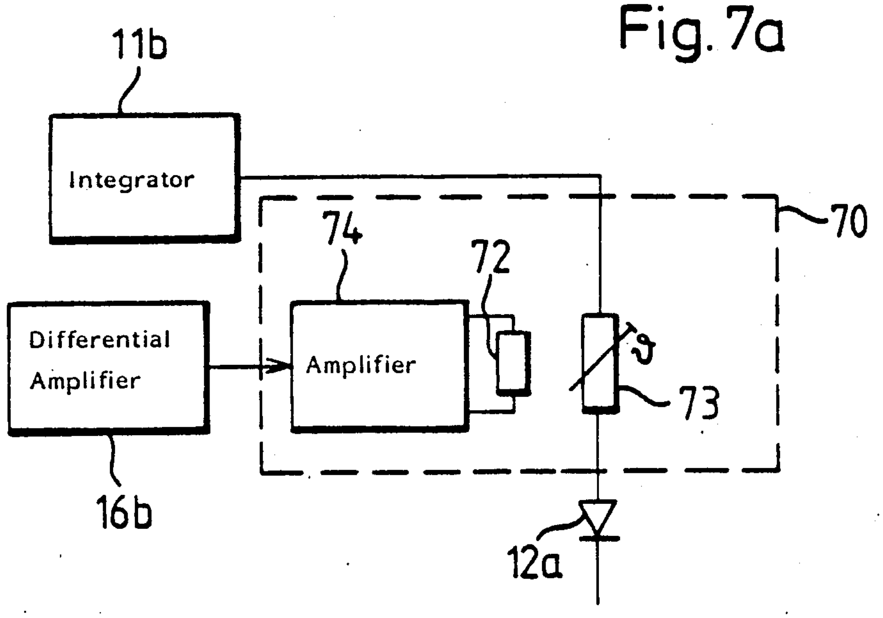
FIGS. 7a and 7b show exemplary embodiments of the variable resistance.

In FIG. 7*a*, the externally heated resistor 73, which is heated by the heating resistor 72, is used as the variable resistor. Aside from a somewhat different dimensioning of the output of the amplifier 74, the remaining configuration and function are exactly as in FIG. 1.

Figure 7B:
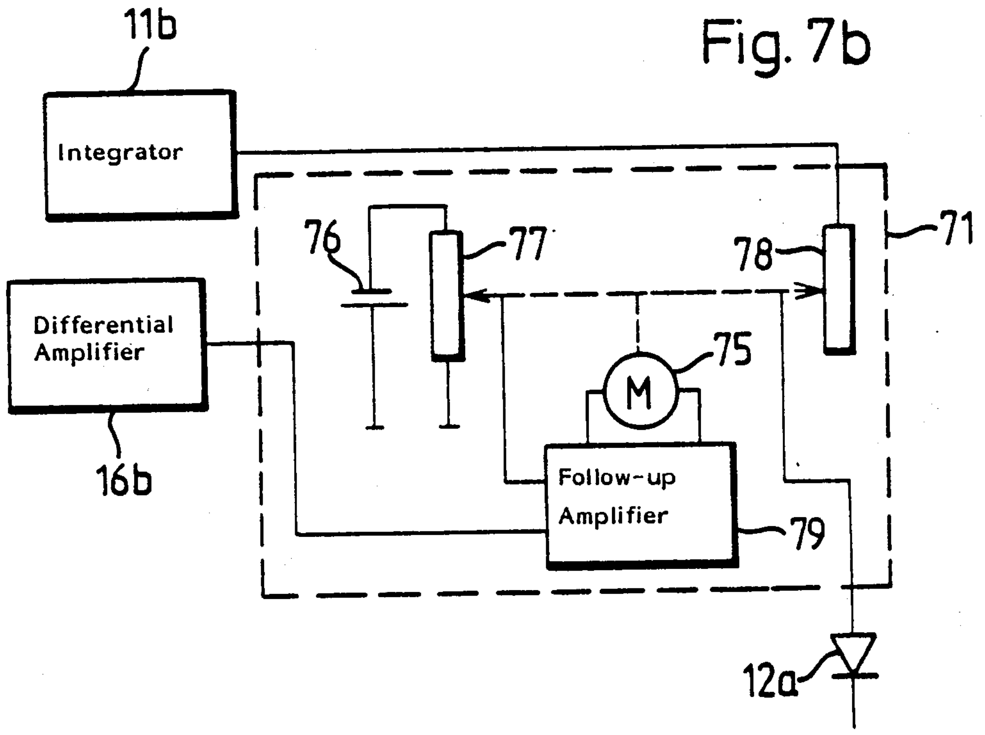

In FIG. 7*b*, a potentiometer controlled by the motor 75 is used as the variable resistor. The follow-up amplifier 79, the motor 75 and the potentiometer 77, which is driven at a constant voltage 76, form a known follow-up system. The follow-up amplifier 79 continuously compares the voltage at the pickup of the potentiometer 77 with the output voltage of the differential amplifier 16*b*, and by controlling the motor 75 moves the pickup such that these voltages are equal. The pickup of the resistor 78 is mechanically coupled with the pickup of the potentiometer 77. In this manner, the portion of the resistor 78 acting as a compensating resistor for the LED is dependent upon the voltage present at the output of the differential amplifier 16*b*.

Figure 8:
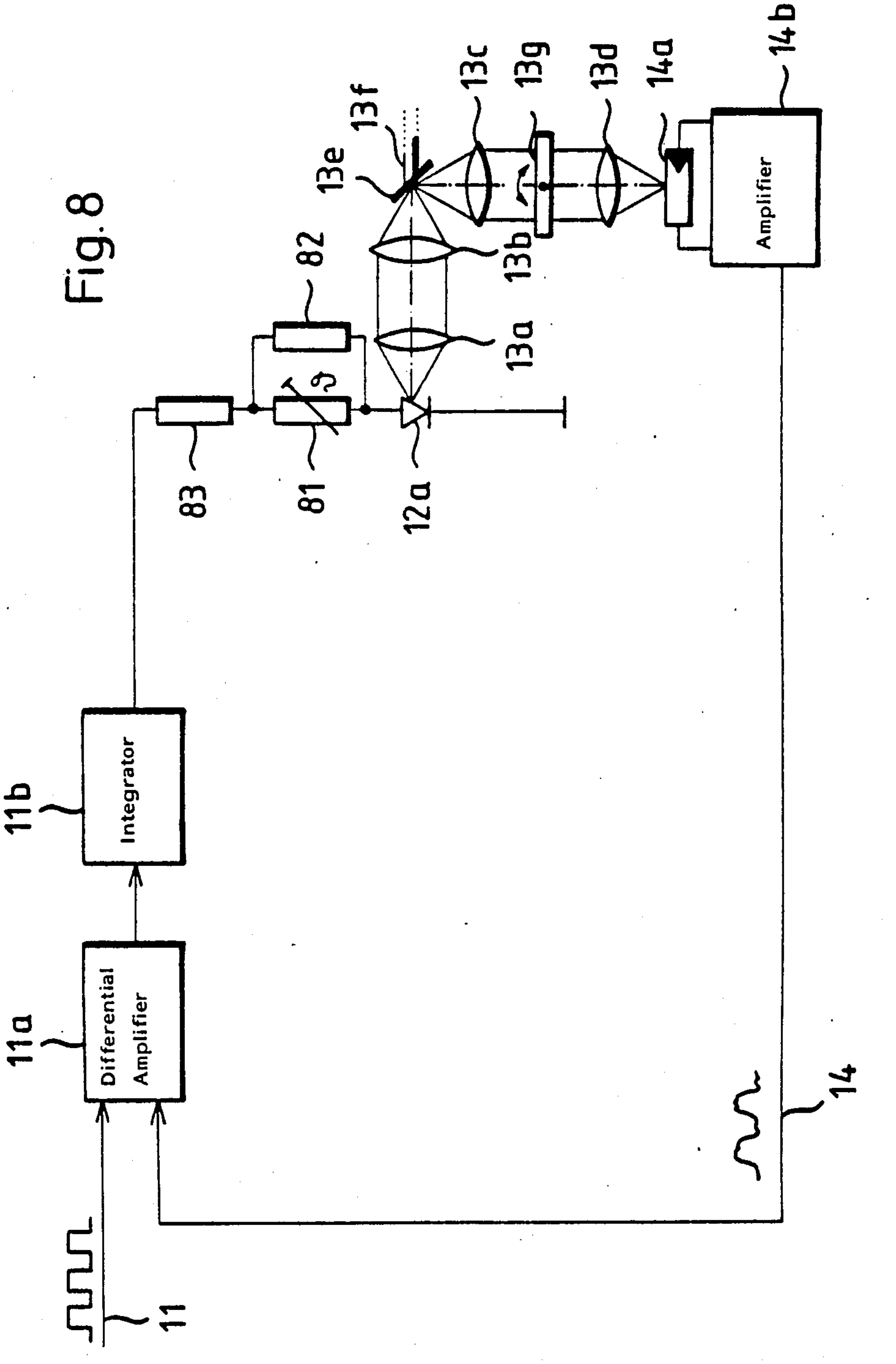
FIG. 8 is a block circuit diagram for the open-loop control of the current of the radiation source using a resistor heated by its own current.

If a very high measurement accuracy is not required, then the characteristic curve shown in FIG. 3*a* for the variable resistor as a function of the current through the radiation source 12*a* can also be realized by a self-heating resistor, which is heated merely by its own current, that is, the current flowing through the self-heating resistor. In this case, a particularly simple configuration is achieved, as shown in FIG. 8. The characteristic curve of the self-heating resistor 81 is adapted to the specified course (FIG. 3*a*) by means of the parallel resistor 82 and the series resistor 83 (the resistance values of which are only slightly dependent on temperature). The amplitude regulation via the reference receiver 14*a* with its amplifier 14*b* and the differential amplifier 11*a* and integrator 11*b* functions as described in conjunction with FIG. 1.

Now if by way of example a change in the temperature of the radiation source occurs, which for the sake of simplicity is assumed to be abrupt, then the regulation will increase the current, as also described in conjunction with FIG. 1; this increases the control time. As a result of the increased current, the resistance of the heatable resistor drops just far enough that the original index time is reestablished. Since in actual practice radiation source temperature changes or aging processes take a slow course, the speed of the change in resistance is sufficient to keep the index time constant.

Figure 4:
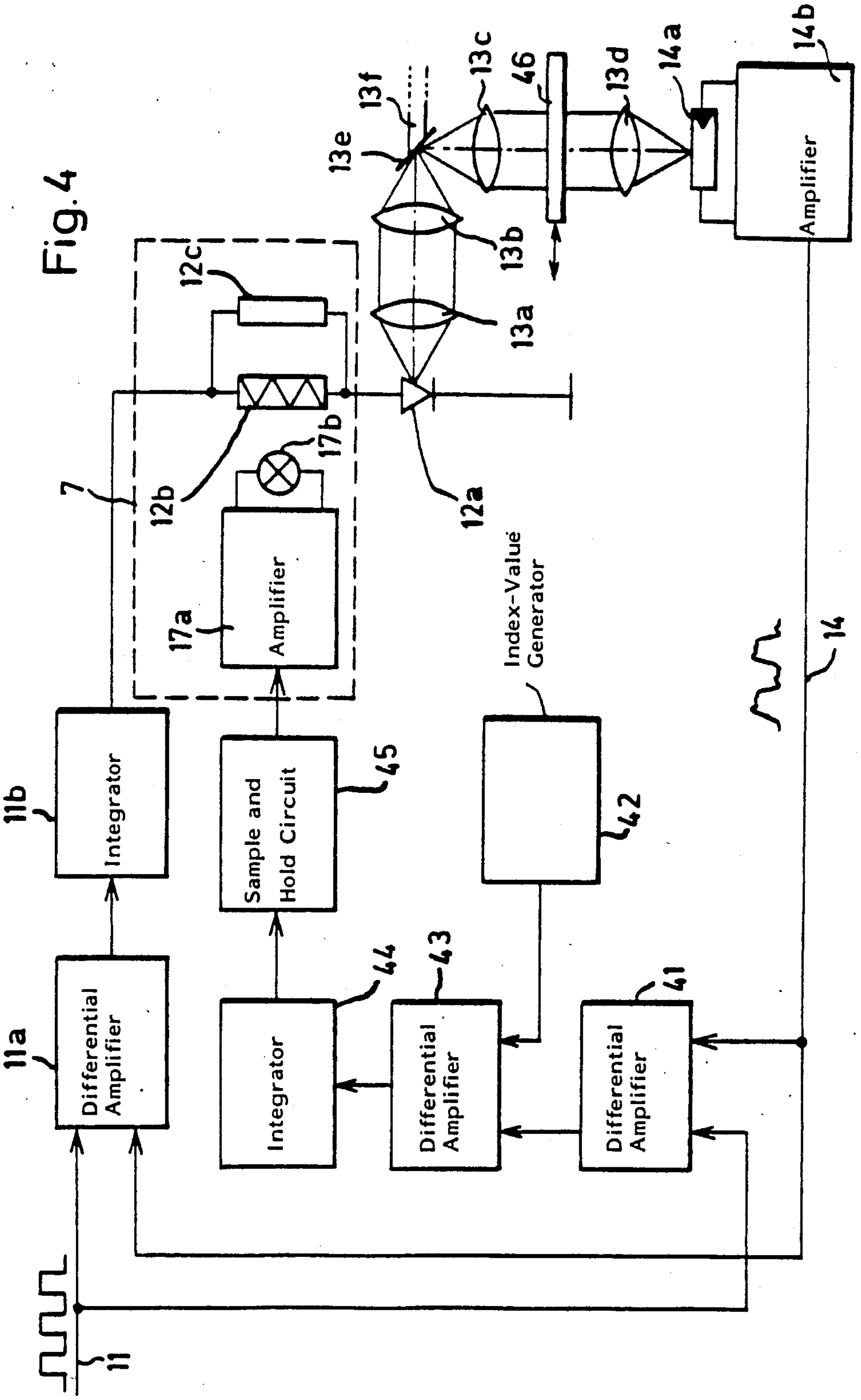
FIG. 4 is a block circuit diagram for the closed-loop control of the current of the radiation source.

FIG. 4 shows a further exemplary embodiment for keeping the delay time constant; here the variable resistor (in contrast to FIG. 1) is part of a closed-loop or regulating circuit. In this case, the reference signal 14 is compared with the command signal 11 in the differential amplifier 41. The two input signals are shown in solid lines in the time diagrams of FIGS. 5*a* and 5*b*. They correspond to FIGS. 2*a* and 2*b* for the amplitude regulation. The output of the differential amplifier 41 is supplied to a second differential amplifier 43, the second input of which is connected to the index-value generator 42. At this generator 42, the delay time value that is to be kept constant by the regulation can be set by means of an adjustable voltage.

Figures 5A, 5B, 5C, 5D, 5E:
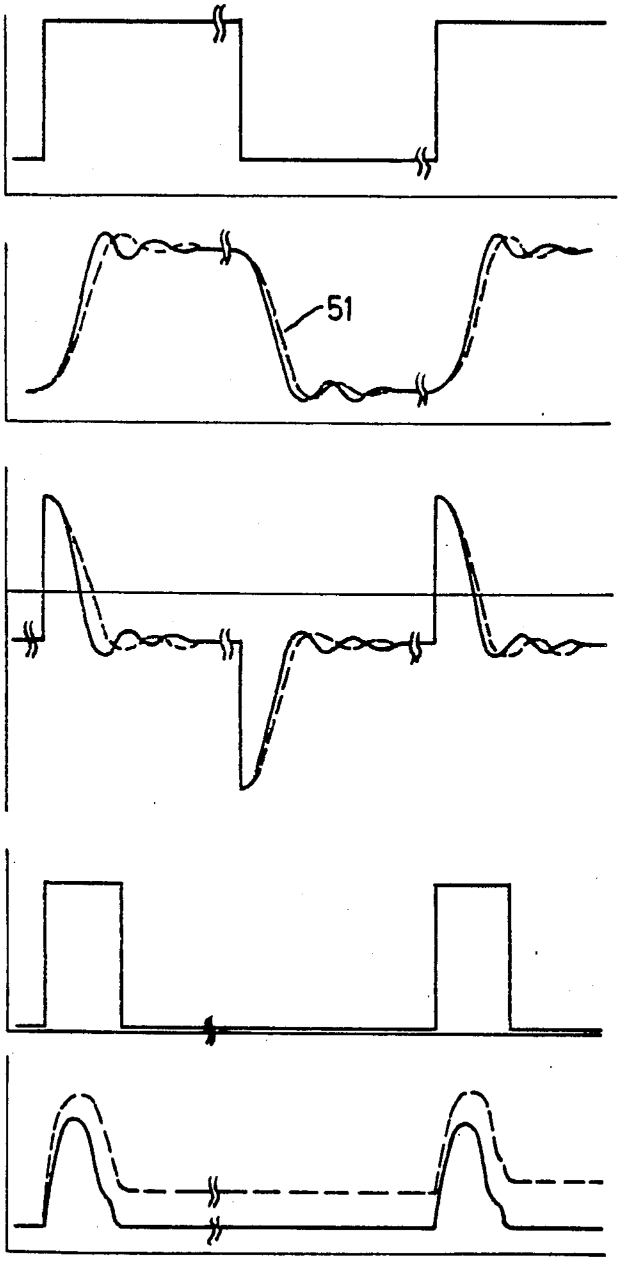
FIGS. 5*a* to 5*e* are time diagrams for explaining the mode of operation of the closed-loop control of FIG. 4.

The output signal of the second differential amplifier 43 is shown in solid lines in FIG. 5*c*. During the periods illustrated in FIG. 5*d*, this output signal is supplied to the integrator 44, the output signal of which is shown in solid lines in FIG. 5*e*. This output signal is taken over, outside of the times that integration takes place, by the sample and hold circuit 45. At the output of the sample and hold circuit 45, a constant and regulated direct voltage is present, which is supplied (as in FIG. 1) to the light source 17*b*, which illuminates the photoresistor 12*b*. If required, the constant direct voltage first can be amplified in amplifier 17*a* shown in FIG. 4.

Now if the emission of radiation lessens, for instance because of an increase in temperature of the radiation source 12*a*, which for the sake of simplicity is again assumed to be abrupt, then (just as in FIG. 1 and as described with reference thereto) a constant amplitude of the modulation signal, via the differential amplifier 11*a* and the integrator 11*b*, is provided. The additional constancy of the delay time is attained by means of the following closed-loop control, which is likewise slower than the amplitude regulation.

After the temperature jump, the reference signal takes the course shown in broken lines in FIG. 5*b*. Because of the slower rise of this signal as compared with the signal shown in solid lines, the signal, which is also shown in broken lines in FIG. 5*c*, at the output of the second differential amplifier 43 also decreases more slowly, and the output signal of the integrator 44 shown in FIG. 5*e* increases more rapidly. Since within the integration time the decrease of the integral is now less than the increase, the output voltage of the integrator 44 does not reach its initial value at the end of the integration time; instead, this output voltage goes to a higher level. The light source 17*b* becomes brighter, the photoresistor 12*b* assumes a lower resistance value, and the delay time of the radiation source 12*a* becomes shorter.

The constancy of the amplitude during this process is provided for by the amplitude regulation via the differential amplifier 11*a* and integrator 11*b*. As a result, the deviation, which is shown at the falloff 51 of the modulation period (FIG. 5*b*), between the signals shown by solid and broken lines has already become less, and the next change of the output signal at the integrator 44 (FIG. 5*e*) has likewise become smaller.

A certain period of time after the temperature jump of the radiation source 12*a*, the voltage at the output of the integrator 44 is again of equal magnitude at the beginning and end of the integration time, and a voltage that remains constant is again present at the output of the sample and hold circuit 45, but this constant voltage is now at a higher level than prior to the temperature jump. It is suitable for the regulation of the delay time to take place over many modulation periods, so that the change is not overly rapid as was shown for the falloff 51 of the first modulation period for the sake of better understanding.

As in FIG. 1, the circuit portion 7 having the light source 17*b* and the photoresistor 12*b* can be replaced in FIG. 4 by a combination of the heating resistor 72 and externally heated resistor 73, as shown in the circuit portion 70 of FIG. 7*a*, or by a potentiometer 77 and motor 75, as shown for the circuit portion 71 of FIG. 7*b*.

It is possible to combine the various open-loop and closed-loop control arrangements with one another; in so doing, both the generation of the open-loop and closed-loop control signals and the various variable resistors can be combined with one another. It is particularly advantageous to combine the open-loop control of FIG. 1 with the closed-loop control of FIG. 4. To this end, the output voltage of the amplifier 16*b* in FIG. 1 is added to the index-value of index-value generator 42 in FIG. 4.

Figure 9:
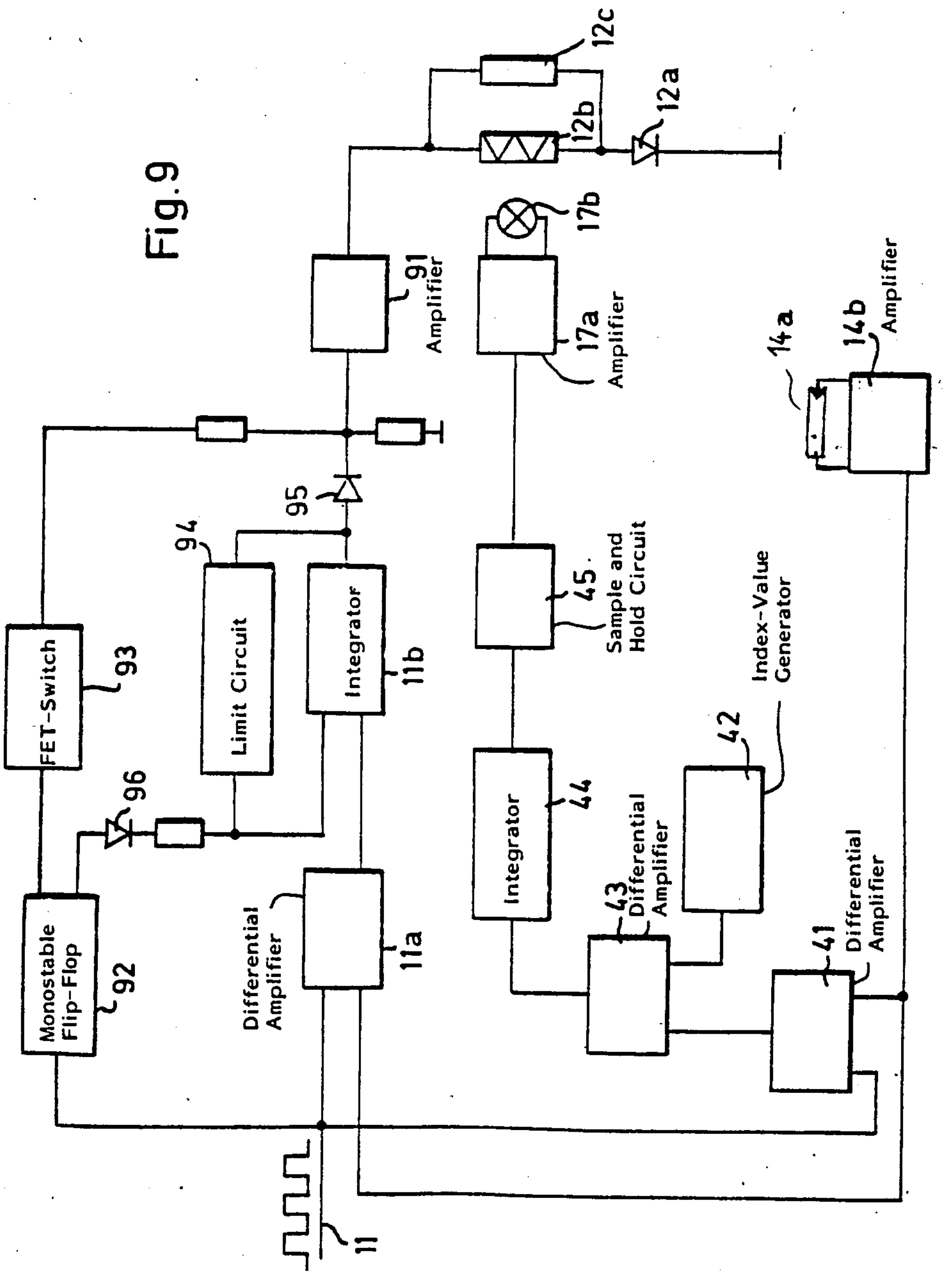
FIG. 9 is a block circuit diagram for the closed-loop control of the current of the radiation source with an additional shutoff for the dark phase; and, FIGS. 10a to 10e are time diagrams for explaining the operation of the additional switch-off of the current for the dark phase.

FIG. 9 shows a block circuit diagram for a further advantageous embodiment of the invention wherein the change in the falloff time, which is caused by the falloff flank of the light modulation, is substantially suppressed in that the light source 12*a* is switched off very quickly in each modulation period. FIGS. 10*a* to 10*e* show the corresponding time diagrams. A fast switch-off of this kind is only possible at the switch-off flank since only here the switching level (current=0), which is to be reached, is preset by definition and is not dependent on external conditions such as time, temperature and the like as is the case with the switch-on flank of the light source and which must be adjusted by means of closed-loop regulation. By means of the following circuit, the switch-off flank can be made so steep that its change caused by the external conditions is so negligible in this delay compared to changes in the rise time associated with the switch-on flank.

Figures 10A, 10B, 10C, 10D, 10E:
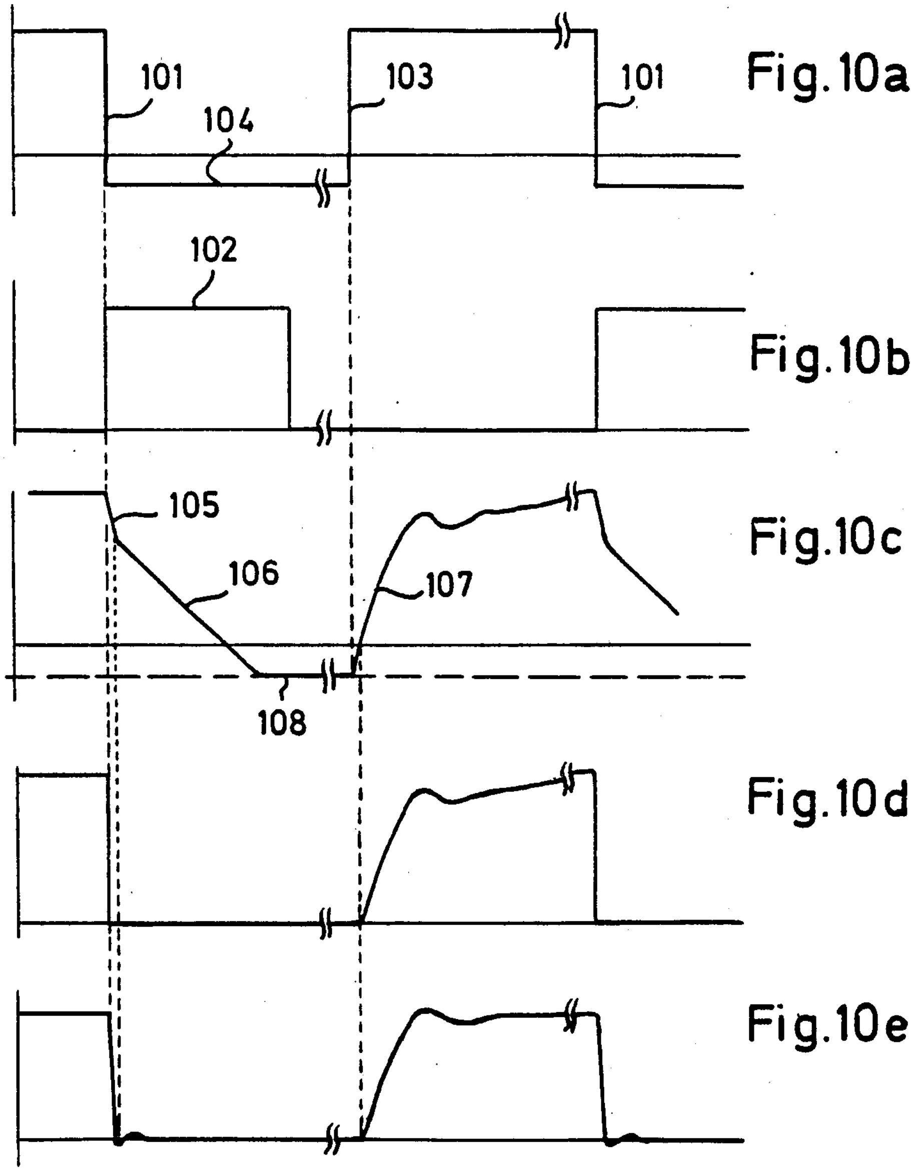

In FIG. 9, the optical configuration (not shown) between the LED 12*a* and the reference receiver 14*a* is the same as shown in FIG. 1 or 4. The closed-loop control of the switch-on flank is effected in FIG. 9 in the same manner as in FIG. 4. The corresponding electronic blocks are therefore designated with the same reference numerals. The fast current switch-off is controlled by the command signal illustrated in FIG. 10*a*. This fast current switch-off, however, is not effected via a closed-loop control portion with the differential amplifier 11*a* and an integrator 11*b*; instead, it is effected by directly acting upon an amplifier 91 connected in follow-on cascade with the integrator 11*b* and diode 95. For this purpose, the falloff flank 101 of the command signal shown in FIG. 10*a* first switches monostable flip-flop 92 on. The output signal of the flip-flop 92 is shown in FIG. 10*b*. The active time 102 of the monostable flip-flop 92 is dimensioned such that it is on the one hand shorter than the smallest dark period 104 of the command signal to be processed and, on the other hand, this active time is longer than the time needed for the integrator 11*b* to reach an appropriate condition for the next closed-loop control operation. During the active time 102 of the monostable flip-flop 92, a negative voltage is switched onto the amplifier 91 via an FET switch 93. This switching operation is very fast and leads to an immediate switch-off of the current flow through the light source 12*a*.

By means of the switching operation, the amplifier 91 first reaches its negative saturation condition, which is again removed after the active time of the monostable flip-flop is completed. Thereupon, the amplifier is again ready for processing the next switch-on flank. With a suitable limit switching of the amplifier 91 by means of which the required output condition is obtained, one could do without the monostable flip-flop 92.

The amplitude control described in the descriptive passages corresponding to FIGS. 4 and 5 cannot at first follow this quick switch-off of the current flow through the light source 12*a*. For this reason, the following two provisions are made so that the amplitude control can again control the current through the light source 12*a* at the very latest by the next switch-on flank 103 of the command signal. First, the command signal is so dimensioned that the level of the dark period 104 is negative. This level can only be realized physically as light which is switched off. And second, the integrator 11*b* has a limit circuit 94 in the form of a feedback.

With these two measures, the following mode of operation of the integrator is obtained.

At the start of the time diagrams shown in FIGS. 10*a* to 10*e*, the integrator integrates the difference between the command signal (FIG. 10*a*) and the reference signal shown in FIG. 10*e* in the same manner as was done with respect to FIG. 4. At first this difference is zero. The output signals of the integrator 11*b* shown in FIG. 10*c* therefore at first remain unchanged. When the command signal suddenly goes to a negative value with its flank 101, the current for the LED 12*a* is abruptly switched off via the monostable flip-flop 92, the FET switch 93 and the amplifier 91 as described above. The output voltage of the amplifier 91 is shown in FIG. 10*d*. The reference signal shown in FIG. 10*e*, however, does not immediately go to zero primarily because of the inertia of the amplifier 14*b*. Therefore, the integrator 11*b* first receives a large input signal and its output signal (FIG. 10*c*) first rapidly reduces in interval 105. When the reference signal (FIG. 10*e*) reaches zero, only the negative value of the command signal (FIG. 10*a*) is present at the integrator as an input signal. The output signal (FIG. 10*c*) of the integrator therefore goes downward linearly in interval 106 until it reaches value 108 predetermined from the limit circuit 94 and then remains unchanged. With this, the integrator 11*b* is in a condition in which it is ready for the closed-loop control of the next modulation signal. The foregoing occurs when the FET switch 93 is switched to "on" at the end of the active time 102 of the monostable flip-flop 92 so that the output of the integrator acts again on the amplifier 91.

When the positive flank 103 of the command signal (FIG. 10*a*) comes, the integrator 11*b* receives a voltage which causes it to make a summation. For this reason, its output voltage increases and the rise 107 is at first steep because the difference between the input voltages is large. Only when the output voltage of the integrator has passed through the value zero, does the integrator act on the follow-on amplifier 91 having the output voltage shown in FIG. 10*d*. In the further course of the rise 107, the curve becomes ever flatter as a consequence of the increasing reference signal. Because of the warming of the LED in the course of each individual modulation signal, the reference signal has the tendency to reduce. This is leveled out by the integrator and it is for this reason that the output voltage (FIG. 10*c*) of the integrator continues to climb somewhat until the end of the modulation signal. In contrast, the reference signal (FIG. 10*e*) quickly reaches the desired constant value in each modulation period.

When processing high frequency modulation signals, it is necessary that the integrator 11*b* be forcibly set to its negative limit during the active time of the monostable flip-flop 92. This occurs with the signal from the output of the monostable flip-flop which is conducted to the input of the integrator via a diode 96.

In the open-loop and closed-loop control described, as much radiation as possible should be available for the reference receiver 14*a*, yet without reducing the radiation that is available for measurement. This can be achieved most simply by means of two identical, series-connected LEDs or semiconductor lasers. Then, however, the individual differences among the various examples may be a problem. These differences are less if two radiation sources are used at a time, integrated onto the same chip. There are no differences, if a single radiation source is used for both the measurement and the reference radiation. In order nevertheless to attain the best possible energy conditions for the measurement and reference radiation, a principle for decoupling the reference light is applied, which will now be explained with reference to FIGS. 6*a* to 6*c*.

In all three figures, the light-conducting fiber, which (as in FIGS. 1 and 4) is identified by reference numeral 13*f*, of the fiber-optical sensor comprises a core and an optical cladding, both indicated as 61, and a protective coating 61*a*.

Figure 6A:
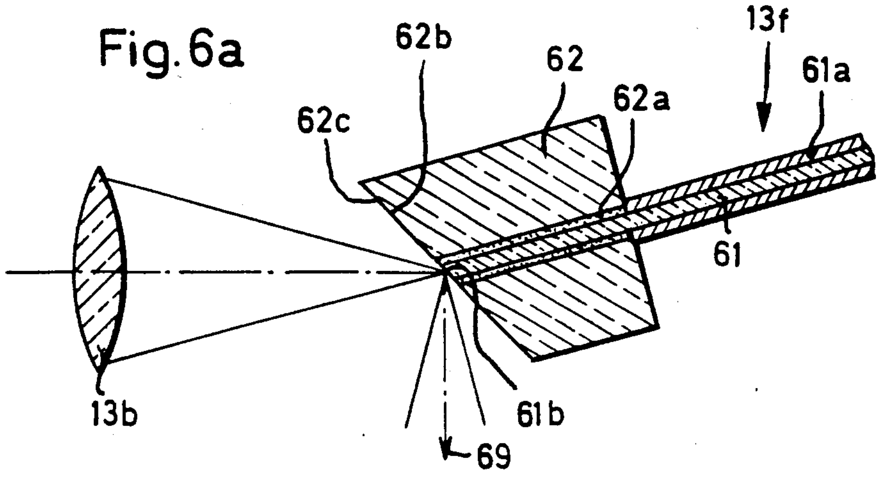
FIGS. 6a to 6c show exemplary embodiments for decoupling the reference light.

In FIG. 6*a* the light-conducting fiber 13*f* is inserted without its protective coating 61*a* into the holder element 62 and joined to it by a cementing layer 62*a*. At its end 61*b*, the light-conducting fiber is cut off at an angle of 45° to the optical axis and polished, together with the surface 62*b*, also inclined at an angle of 45°, of the holder element 62. A mirror coating 62*c* is applied to the surface 62*b*, and using known technology care is taken to assure that of the surface 61*b* of the light-conducting fiber, the core remains free. Therefore, by means of the mirror coating 62*c*, all the radiation that is not imaged into the core of the light-conducting fiber 13*f* by the lens 13*b*, because of imaging errors and because of the spread of the radiation source, is reflected in the direction of the arrow 69 and hence onto the receiver 14*a*. In this manner, in contrast to known arrangements having radiation dividers, it is assured that the decoupling of the reference light will not involve a loss of energy of the radiation coupled into the light-conductor fiber.

The arrangement described by FIG. 6*a* has the disadvantage that the light-conducting fiber 13*f* is firmly joined to the holder element 62, so that if the light-conducting fiber is replaced, the holder element is also removed, and the adjustment with respect to the lenses 13*b* and 13*c* will be lost. This is avoided in the exemplary embodiments shown in FIGS. 6*b* and 6*c*.

Figure 6B:
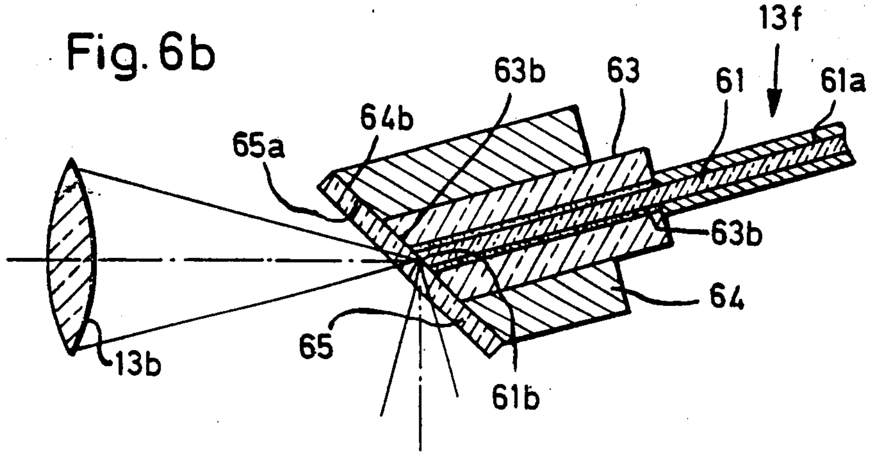

In FIG. 6*b*, the light-conducting fiber 13*b* is secured, without its protective jacket 61*a*, in the coupling element 63 by means of the cementing layer 63*b*. The coupling element 63 is removably mounted in the holder element 64 and the latter is firmly joined to the flat plate 65. The mirror coating 65*a* is applied on the inner side of the flat plate 65. The holder element 64 can be fixed permanently in place after a one-time adjustment with respect to the lenses 13*b* and 13*c*.

Figure 6C:
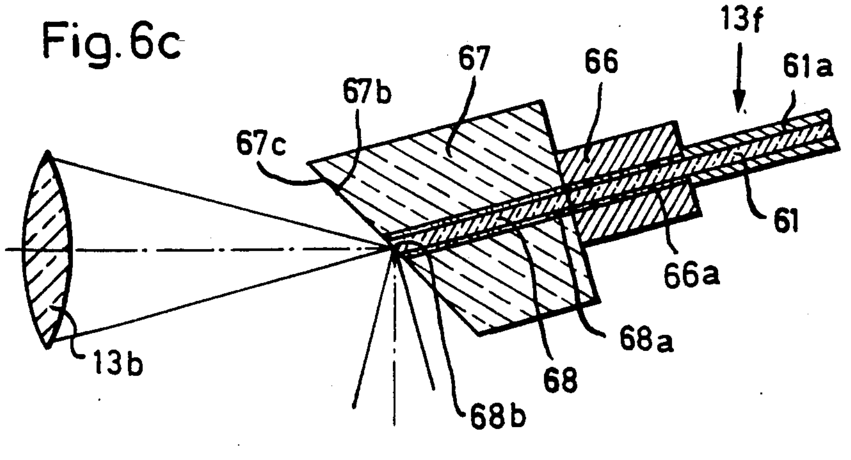

FIG. 6*c* shows an embodiment in which the light-conducting fiber 13*f*, again without its protective coating 61*a*, is secured in a coupling element 66 by means of the cementing layer 66*a*. This coupling element is pressed removably and in a centered manner against the holder element 67 by a mechanical device, not shown. A light-conducting fiber 68 having the same diameters for its core and its optical cladding as the light-conducting fiber 13*f* is cemented into the holder element 67. This holder element is machined and mirror-finished together with the light-conducting fiber in the same manner as was the holder element 62 of FIG. 6*a*. Because of its releasable connection with the coupling element 66, this holder element can again be permanently fixed after a one-time adjustment.

The light reflected in the direction 69 (FIG. 6*a*) with the aid of the above-described decoupling devices is concentrated onto the reference receiver 14*a* by the focusing lenses 13*c* and 13*d* (FIGS. 1 and 4). To lessen the influence of scattered light, it can be advantageous to position the reference receiver obliquely.

As much as possible, the spectral distribution of the measurement light must be evaluated by the reference receiver with the same function that is standard for the effect triggered by the measurement light. In the case of the temperature sensor described in published German patent application DE-OS No. 32 02 089, for example, this is fluorescent excitation. It is difficult to achieve an accurate spectral adaptation of the receiver sensitivity to this type of function using filters having an invariable transmissivity curve, and so this must be performed individually if the spectral sensitivities of the receivers vary. Accordingly, it is suitable to dispose a filter having a changeable spectral characteristic in the path of the reference radiation. A particularly suitable filter for this purpose is an interference wedge-type filter 46, as shown in FIG. 4, which is displaceable at right angles to the path of the radiation, or an interference filter 13*g*, as shown in FIG. 1, which is rotatable about an axis at right angles to the path of the radiation. The criterion used for setting purposes can be the dependency on the radiation capacity of the radiation source 12*a*. To this end, the temperature of the radiation source, for instance, is varied and the filter position at which there is the least dependency on the temperature of the radiation source can be ascertained by experimentation.

It is understood that the foregoing description is that of the preferred embodiments of the invention and that various changes and modifications may be made thereto without departing from the spirit and scope of the invention as defined in the appended claims.

What is claimed is:

1. A current supply for a light-emitting semiconductor device for a frequency-proportional optical sensor, the current supply generating a modulated current thereby producing a time modulated light signal having a constant amplitude and a certain delay time, said current supply comprising:

a first feedback circuit with a first response time including: a reference photoelectric receiver for receiving a portion of the light emitted by said semiconductor device and for generating a reference signal; and, first control means receiving said reference signal and increasing the amplitude of said modulated current when the intensity of the received portion of light lowers in order to hold the amplitude of said light signal constant; and, a second feedback circuit with a second response time slower than said first response time, said second feedback circuit including: variable resistance means connected in series with said light-emitting semiconductor device; and, second control means for lowering the resistance of said variable resistance means in response to an increase in the modulated current in order to hold said delay time constant.

2. The current supply of claim 1, said semiconductor device being a light emitting diode and said sensor being an frequency-proportional fiber optical sensor.

3. The current supply of claim 1, said variable resistance means being a thermistor heated by said current.

4. The current supply of claim 1, said second control means further comprising:

a resistor connected in series with said variable resistance means for generating a control signal;

an RC-component connected to said resistor for averaging the voltage of said control signal;

an index-value generator for generating an index-value indicative of the delay time to be held constant by said second feedback circuit; and, a differential amplifier for forming an output signal operatively applied to said variable resistance means, said differential amplifier having a first input connected to said RC-component and a second input connected to said index-value generator.

5. The current supply of claim 1, said second control means comprising a resistor connected in series with said variable resistance means for generating a control signal, said second control means further including:

an RC-component connected to said resistor for averaging the voltage of said control signal; and, network means connected to the output of said RC-component for receiving the averaged value of said control signal and for forming an output signal for operatively acting on said variable resistance means so as to cause the latter to take on values of resistance which have a predetermined dependency upon said control signal.

6. The current supply of claim 1, said second control means including circuit means for generating a regulating signal for operating on said variable resistance means, said circuit means including:

a first differential amplifier for generating a first difference signal between said reference signal and a command signal;

an index-value generator for generating an index-value signal indicative of the delay time to be held constant by said control means;

a second differential amplifier for generating a second difference signal between the output of said first differential amplifier and the output of said index-value generator;

an integrator connected to the output of said second differential amplifier; and, a sampling and hold circuit connected to the output of said integrator and having an output for operatively acting on said variable resistance means.

7. The current supply of claim 6, said command signal being a waveform having a positive value and a negative value, said first control means including ancillary circuit means for rapidly interrupting the current supplied to said semiconductor device when said command signal falls to said negative value.

8. The current supply of claim 7, said first control means including: a differential amplifier having first and second inputs for receiving said command signal and said reference signal, respectively; and, an integrator connected between said last-mentioned differential amplifier and said variable resistance means; and said ancillary circuit means including:

an amplifier connected between said integrator and variable resistance means;

monostable flip-flop means for switching into the active state thereof in response to a drop of said command signal to said negative value thereof; and, switching means connected between the output of said flip-flop means and said last-mentioned amplifier for responding to said active state by applying an input voltage to said last-mentioned amplifier so as to render the latter incapable of processing said command signal.

9. The current supply of claim 8, said ancillary circuit means comprising limit circuit means for applying a limit value to said integrator so as to permit the latter to again operate on said last-mentioned amplifier when said switching means returns to its initial condition.

10. The current supply of claim 1, said variable resistance means being a photoresistor; and, said second control means including a light source for illuminating said photoresistor for varying the latter for holding said delay time constant.

11. The current supply of claim 1, said variable resistance means being a thermistor; and, said second control means comprising a heating resistor for imparting heat to said thermistor for varying the latter for holding said delay time constant.

12. The current supply of claim 1, said variable resistance means being potentiometer means; and, said second control means comprising motor means for actuating said potentiometer means for varying the latter for holding said delay time constant.

13. The current supply of claim 1, wherein the optical sensor includes:

a holder defining a surface;

a light-conducting fiber having a beveled inlet surface to receive the light of said semiconductor device and being mounted in said holder so as to cause said inlet surface to be flush with said surface of said holder; and, reflective means applied to said surface of said holder and to said fiber except for the core of the latter.

14. The current supply of claim 1, comprising optical means mounted ahead of said reference receiver for changing the spectral distribution of said portion of the light received by said reference receiver.

15. The current supply of claim 1, said semiconductor device being a semiconductor laser; and said sensor being an frequency-proportional fiber optical sensor.

* * * * *

UNITED STATES PATENT AND TRADEMARK OFFICE

CERTIFICATE OF CORRECTION

PATENT NO. : 4,707,838

DATED : November 17, 1987

INVENTOR(S) : Alfred Reule and Joachim Schröder

It is certified that error appears in the above-identified patent and that said Letters Patent is hereby corrected as shown below:

In column 7, line 53: delete "delay" and substitute -- time -- therefor.

In column 7, line 53: delete "rise" and substitute -- delay -- therefor.

In column 12, line 34: after the word "when" add -- said flip-flop means returns to its inactive state and --.

Signed and Sealed this

Ninth Day of August, 1988

*Attest:*

DONALD J. QUIGG

*Attesting Officer*

*Commissioner of Patents and Trademarks*